US009436265B2

(12) United States Patent
Kanemasa et al.

(10) Patent No.: US 9,436,265 B2
(45) Date of Patent: Sep. 6, 2016

(54) INFORMATION PROCESSING APPARATUS AND LOAD CONTROL METHOD

(71) Applicants: FUJITSU LIMITED, Kawasaki-shi, Kanagawa (JP); The Georgia Tech Research Corporation, Atlanta, GA (US)

(72) Inventors: Yasuhiko Kanemasa, Kawasaki (JP); Qingyang Wang, Atlanta, GA (US); Calton Pu, Atlanta, GA (US)

(73) Assignees: FUJITSU LIMITED, Kawasaki (JP); THE GEORGIA TECH RESEARCH CORPORATION, Atlanta, GA (US)

( * ) Notice: Subject to any disclaimer, the term of this patent is extended or adjusted under 35 U.S.C. 154(b) by 195 days.

(21) Appl. No.: 14/062,260

(22) Filed: Oct. 24, 2013

(65) Prior Publication Data

US 2015/0121103 A1  Apr. 30, 2015

(51) Int. Cl.
*G06F 1/32* (2006.01)

(52) U.S. Cl.
CPC ............ *G06F 1/324* (2013.01); *G06F 1/3206* (2013.01); *G06F 1/3228* (2013.01); *Y02B 60/142* (2013.01); *Y02B 60/167* (2013.01)

(58) Field of Classification Search
CPC ..... G06F 1/324; G06F 1/3203; G06F 1/3206
See application file for complete search history.

(56) References Cited

U.S. PATENT DOCUMENTS

| | | | | |
|---|---|---|---|---|
| 6,076,171 A * | 6/2000 | Kawata | ........................ | 713/501 |
| 8,572,421 B2 * | 10/2013 | de Cesare et al. | ............ | 713/323 |
| 8,839,006 B2 * | 9/2014 | Li | ........................ | G06F 1/3228 |
| | | | | 327/544 |
| 2004/0123297 A1 * | 6/2004 | Flautner | ................ | G06F 1/3203 |
| | | | | 718/102 |
| 2005/0262365 A1 * | 11/2005 | Lint et al. | ...................... | 713/300 |
| 2006/0294400 A1 * | 12/2006 | Diefenbaugh | .......... | G06F 1/206 |
| | | | | 713/300 |
| 2007/0049133 A1 * | 3/2007 | Conroy | ..................... | G06F 1/26 |
| | | | | 439/894 |
| 2008/0162965 A1 * | 7/2008 | Marinas | .................... | G06F 1/32 |
| | | | | 713/320 |
| 2009/0307509 A1 * | 12/2009 | Jenne | .................... | G06F 1/3203 |
| | | | | 713/322 |
| 2011/0107115 A1 * | 5/2011 | Verdun | ......................... | 713/300 |
| 2011/0314312 A1 * | 12/2011 | Naffziger et al. | ............. | 713/323 |

(Continued)

FOREIGN PATENT DOCUMENTS

| | | |
|---|---|---|
| JP | 2002-182776 | 6/2002 |
| JP | 2004-29983 | 1/2004 |
| JP | 2005-285093 | 10/2005 |
| JP | 2006-524374 | 10/2006 |

(Continued)

OTHER PUBLICATIONS

Brown, Len, Robert Moore, et al. "ACPI in Linux Architecture, Advances, and Challenges." Proceedings of the Linux Symposium 1 (2005): 59-76. Web. Jun. 16, 2015. <https://www.kernel.org/doc/ols/2005/ols2005v1-pages-59-76.pdf>.*

(Continued)

*Primary Examiner* — Jaweed A Abbaszadeh
*Assistant Examiner* — Brian J Corcoran
(74) *Attorney, Agent, or Firm* — Staas & Halsey LLP

(57) ABSTRACT

An information processing apparatus includes a processor that is capable of switching a performance level to one of a plurality of performance levels with different power consumption, and a storage unit that stores a program for controlling the performance level of the processor. The processor executing the program detects the periodicity of load variation of the information processing apparatus, and changes, according to the periodicity of the load variation, a determination interval for determining whether to switch the performance level of the processor.

6 Claims, 13 Drawing Sheets

(56) References Cited

U.S. PATENT DOCUMENTS

2012/0144217 A1* 6/2012 Sistla et al. .................. 713/320
2013/0311755 A1* 11/2013 Henry .................... G06F 1/329
                                                        712/226
2014/0033207 A1* 1/2014 Sharma ........................ 718/100

FOREIGN PATENT DOCUMENTS

| | | |
|---|---|---|
| JP | 2009-110509 | 5/2009 |
| WO | WO 2004-102363 | 11/2004 |
| WO | WO 2010-038459 A1 | 4/2010 |

OTHER PUBLICATIONS

Patent Abstracts of Japan, Publication No. 2002-182776, Published Jun. 26, 2002.
Patent Abstracts of Japan, Publication No. 2005-285093, Published Oct. 13, 2005.
Patent Abstracts of Japan, Publication No. 2004-29983, Published Jan. 29, 2004.
Patent Abstracts of Japan, Publication No. 2009-110509, Published May 21, 2009.

* cited by examiner

| P-STATE | CLOCK FREQUENCY |
|---------|-----------------|
| P0 | 2261 MHz |
| P1 | 2128 MHz |
| P2 | 1995 MHz |
| P3 | 1862 MHz |
| P4 | 1729 MHz |
| P5 | 1596 MHz |
| P6 | 1463 MHz |
| P7 | 1330 MHz |
| P8 | 1197 MHz |

FIG. 4

HISTORY TABLE            125

| TIME | P-STATE |
|---|---|
| 2013-04-01 12:00:01.500 | P0 |
| 2013-04-01 12:00:02.500 | P8 |
| 2013-04-01 12:00:03.000 | P4 |
| 2013-04-01 12:00:03.500 | P0 |
| 2013-04-01 12:00:05.000 | P8 |
| ⋮ | ⋮ |

FIG. 8

INFORMATION PROCESSING APPARATUS AND LOAD CONTROL METHOD

FIELD

The embodiments discussed herein relate to an information processing apparatus and a load control method.

BACKGROUND

In recent years, with an improvement in the throughput of computers, there arises a problem of an increase in the power consumption of processors installed in the computers. One of techniques for reducing the power consumption of processors is Dynamic Voltage and Frequency Scaling (DVFS). A processor using the DVFS technique operates at a plurality of performance levels with different clock frequencies and/or different voltages. The performance level may be called P-state. As a clock frequency or voltage is lowered (i.e., a performance level is decreased), the power consumption of a processor will be reduced. Therefore, dynamically decreasing a performance level results in reducing wasteful power consumption of a processor. However, when a processor operates at a low performance level, the processing speed thereof slows down accordingly.

Some types of system software such as Basic Input/Output System (BIOS), Operating System (OS), etc. are capable of switching the performance level of a processor according to processor utilization. For example, when the processor utilization goes down, such system software decreases the performance level of the processor, thereby reducing power consumption. When the processor utilization goes up, on the other hand, the system software increases the performance level and waits for the processor utilization to go down.

In many cases, it is determined at predetermined regular intervals whether to switch the performance level of a processor. For example, the system software confirms processor utilization at the predetermined regular intervals, and determines according to the confirmed processor utilization whether to switch the performance level. In connection with this, there is proposed a semiconductor apparatus that changes the frequency of determining whether to switch a performance level so as not to switch the performance level too frequently. This semiconductor apparatus counts how many times a clock frequency and voltage were changed in the past, and decreases the frequency of making the determination if the count is high and, on the other hand, increases the frequency of making the determination if the count is low.

Further, there is also proposed a power management method in which an OS monitors processor information and selects the run state of a processor from among a plurality of run states having different performance levels, according to the processor information. In this power management method, the OS predicts future processor information based on sampled past processor information, and selects the run state of the processor based on an average of the past and future processor information. Still further, there is proposed a system for selecting a target P-state based on a percentage of time a processor is busy. This system periodically reduces the selection of the target P-state while the processor is 100% busy.

Please refer to Japanese Laid-open Patent Publication No. 2004-29983, International Publication Pamphlet No. WO 2004/102363, and Japanese Laid-open Patent Publication No. 2009-110509.

By the way, load (for example, the amount of requests received per unit time from other computers) on a computer is often inconstant and may vary with periodicity. In this case, a mismatch between the load and the performance level of a processor may occur and continue depending on a period of load variation, and therefore efficiency of processor utilization is reduced.

For example, assume that load on a computer rapidly rises when a processor operates at a low performance level. In this case, the performance level remains low until it is determined next time whether to switch the performance level. As a result, the number of pending requests increases, which causes long response delays. After determining whether to switch the performance level, the performance level of the processor is increased and the number of pending requests decreases. Then, even if the load on the computer rapidly falls, the performance level remains high until it is determined next time whether to switch the performance level. As a result, the processor consumes power wastefully in view of the load.

Such a mismatch between the load and the performance level of a processor continues if the period of load variation is equal to or approximate to an interval for determining whether to switch the performance level. More specifically, a state where the load rises but the performance level of the processor remains low and a state where the load falls but the performance level of the processor remains high appear alternately and repeatedly. That is to say, the DVFS, which is a technique for power saving of a processor, may cause a problem of a reduction in the efficiency of processor utilization. On the other hand, if a fixed short interval is used for determining whether to switch the performance level, an overhead for controlling the performance level increases and the power saving effect of the DVFS is reduced.

SUMMARY

According to one aspect, there is provided an information processing apparatus that includes: a processor configured to be capable of switching a performance level to one of a plurality of performance levels with different power consumption; and a storage unit configured to store a program for controlling the performance level of the processor. The processor executing the program detects periodicity of load variation of the information processing apparatus, and changes, according to the periodicity of the load variation, a determination interval for determining whether to switch the performance level of the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an exemplary correspondence between P-states and clock frequencies;

FIG. 8 illustrates an example of a history table;

DESCRIPTION OF EMBODIMENTS

Figure 1:
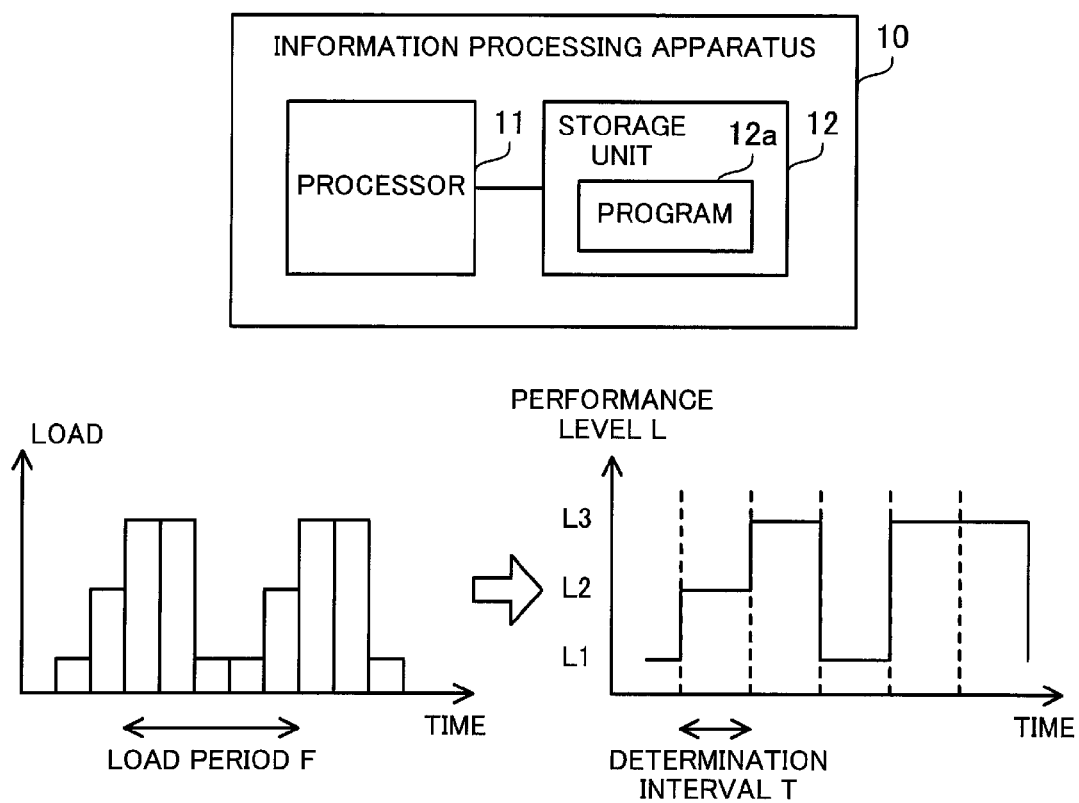
FIG. 1 illustrates an information processing apparatus according to a first embodiment.

Several embodiments will be described below with reference to the accompanying drawings, wherein like reference numerals refer to like elements throughout.

(a) First Embodiment

FIG. 1 illustrates an information processing apparatus according to a first embodiment.

An information processing apparatus 10 of the first embodiment includes a processor 11 and a storage unit 12. The information processing apparatus 10 may be called a computer, physical machine, or the like.

The processor 11 executes various programs including a BIOS program, OS program, application program, etc. The processor 11 may be provided with a plurality of cores for performing such programs in parallel. The processor 11 may be called a Central Processing Unit (CPU), Micro-Processing Unit (MPU), or the like. In this connection, the processor 11 may further include Application-Specific Integrated Circuit (ASIC), Field Programmable Gate Array (FPGA), and others.

The processor 11 is capable of switching its performance level L to one of a plurality of performance levels with different power consumption. The performance levels differ in at least one of a clock frequency and voltage during program execution. For example, at a lower performance level L, the processor 11 operates at a lower clock frequency and/or voltage and consumes less power. A so-called P-state may be considered as the performance level L. The processor 11 may be provided with a control circuit for dynamically changing the frequency of a clock signal and voltage to be supplied to a core.

The storage unit 12 stores a program 12a. The storage unit 12 may be a primary storage device such as a Random Access Memory (RAM), or a secondary storage device such as a Hard Disk Drive (HDD). In addition, the storage unit 12 may be a flash memory or Read Only Memory (ROM) installed on a substrate. The program 12a controls the performance level L of the processor 11. The program 12a may be a program of system software such as BIOS or OS. The program 12a or another program called by the program 12a instructs the control circuit of the processor 11 to switch the performance level L.

The processor 11 executes the program 12a to control the performance level L in the following manner. The processor 11 detects the periodicity of past load variation of the information processing apparatus 10, and changes a determination interval T for determining whether to switch the performance level L of the processor 11 according to the detected periodicity of the load variation. For example, at every determination interval T, the processor 11 confirms the utilization of the processor 11 and determines whether to switch the performance level L according to the utilization of the processor 11. For example, the processor 11 increases the performance level L when the utilization of the processor 11 is high and, on the other hand, decreases the performance level L when the utilization of the processor 11 is low.

To calculate the determination interval T, for example, the processor 11 calculates a load period F that is a period of past load variation (for example, load variation within a prescribed recent time period or a predetermined number of load variations). The load here refers to a backlog of information processing that needs to be performed by the information processing apparatus 10, and for example, corresponds to the number of requests received per unit time by the information processing apparatus 10 or the number of pending requests remaining in a queue. In this connection, the processor 11 may be designed to obtain history information about switching of the performance level L and estimate the past load variation on the basis of the history information. Using the history information about the performance level L to estimate the load variation eliminates the need for the processor 11 to refer to queue length information or other information at the application layer. By doing so, it is possible to control the performance level L efficiently at the system software layer. In this case, for example, the processor 11 calculates a time period between the times at which the performance level L was increased to a threshold level or higher, as the load period F.

When the load period F is calculated, the processor 11 calculates the determination interval T from the load period F. For example, the processor 11 sets the determination interval T that is shorter than the load period F. 1/n (n is an integer of two or higher) of the load period F may be set as the determination interval T. It is preferable that, when the load period F varies, the determination interval T is changed accordingly. For example, when a shorter load period F is calculated, a shorter determination interval T is set. Conversely, when a longer load period F is calculated, a longer determination interval T is set. This makes it possible to reduce the risk of setting the determination interval T excessively shorter than is appropriate for eliminating a mismatch between load and performance level L. If the load variation is determined to have no periodicity, the processor 11 may prevent shortening of the current determination interval T.

As described above, the information processing apparatus 10 of the first embodiment changes the determination interval T for determining whether to switch the performance level L of the processor 11 according to the periodicity of load variation of the information processing apparatus 10. This makes it possible to reduce a mismatch between load and performance level L, which mismatch may continue when the load period F is equal to or approximate to the determination interval T. That is, it is possible to prevent a state where the load rises but the performance level L remains low and a state where the load falls but the performance level L remains high from appearing alternately and repeatedly. As a result, the processor 11, even using the DVFS technique, is able to operate efficiently. In addition, the determination interval T is changed according to the load period F, which prevents the determination interval T from becoming excessively short. Further, an overhead for controlling the performance level L is reduced and power saving of the processor 11 is achieved.

(b) Second Embodiment

Figure 2:
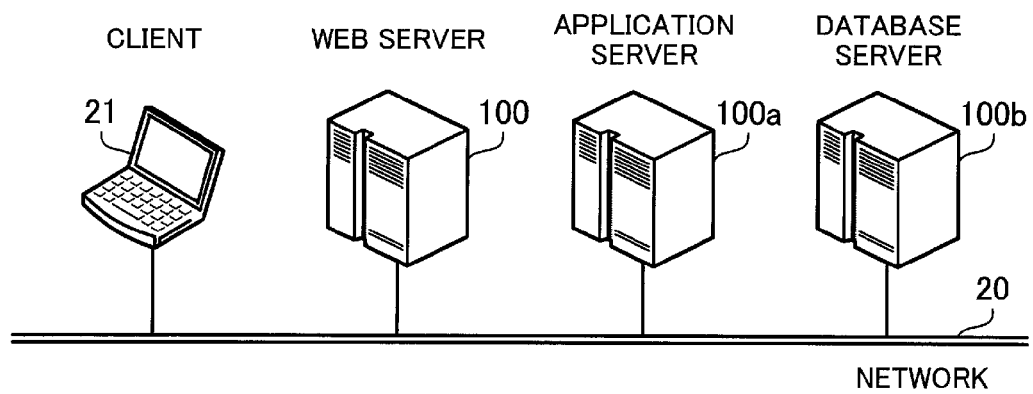
FIG. 2 illustrates an information processing system according to a second embodiment.

FIG. 2 illustrates an information processing system according to a second embodiment.

An information processing system of the second embodiment is a Web-based system with so-called 3-Tier architecture. This information processing system includes a client 21, Web server 100, application server 100a, and database server 100b. The client 21, Web server 100, application server 100a, and database server 100b are connected to a network 20. A wide area network may be set up between the client 21 and the network 20.

The client 21 is a client computer that is a terminal operated by a user, and executes a Web browser to display Web pages. The client 21 sends requests to the Web server 100 using a Hypertext Transfer Protocol (HTTP), and receives responses to the requests from the Web server 100. In general, an HTTP request includes the identification information of a requested Web page, and an HTTP response includes the data of the Web page to be displayed.

The Web server 100 is a server computer that performs information processing according to requests from the client 21. The Web server 100 executes application software (Web server software) for controlling HTTP communications. When receiving an HTTP request from the client 21, the Web server 100 identifies business logic for use in generating the data of the requested Web page, and sends a request for executing the business logic to the application server 100a. The Web server 100 then receives a response including the result of executing the requested business logic from the application server 100a. The Web server 100 then generates the data of the Web page based on the result of executing the business logic, and sends an HTTP response to the client 21.

The application server 100a is a server computer that performs information processing according to requests from the Web server 100. The application server 100a executes application software that embodies business logic. When receiving a request from the Web server 100, the application server 100a executes specified business logic. At this time, the application server 100a identifies data to be used for the business logic, and sends a request for accessing the data to the database server 100b. Data accesses are for data manipulations such as retrieval, addition, update, deletion, and so on of data. Then, the application server 100a receives a response indicating the result of the requested data access from the database server 100b. Then, the application server 100a completes the business logic using the result of the data access (for example, using retrieved data) and sends a response to the Web server 100.

The database server 100b is a server computer that performs information processing according to requests from the application server 100a. The database server 100b executes application software (database management system (DBMS), etc.) for managing data. The database server 100b stores the data in a non-volatile storage device such as an HDD. When receiving a request from the application server 100a, the database server 100b accesses the requested data, and sends a response indicating the result of the data access, to the application server 100a. If the requested data access is retrieval of data, a response includes the retrieved data. If the requested data access is addition, update, deletion, or the like of data, the response includes information indicating whether the data access is successful or not.

In the Web-based system with 3-Tier architecture, the presentation layer, application layer, and data layer may perform the functions of the Web server 100, the functions of the application server 100a, and the functions of the database server 100b, respectively. Referring to FIG. 2, the presentation layer, application layer, and data layer are implemented by using different server computers. Alternatively, two or more layers may be implemented by using a single server computer. For example, the application software of the Web server 100 and application server 100a may be executed by using a single server computer.

Figure 3:
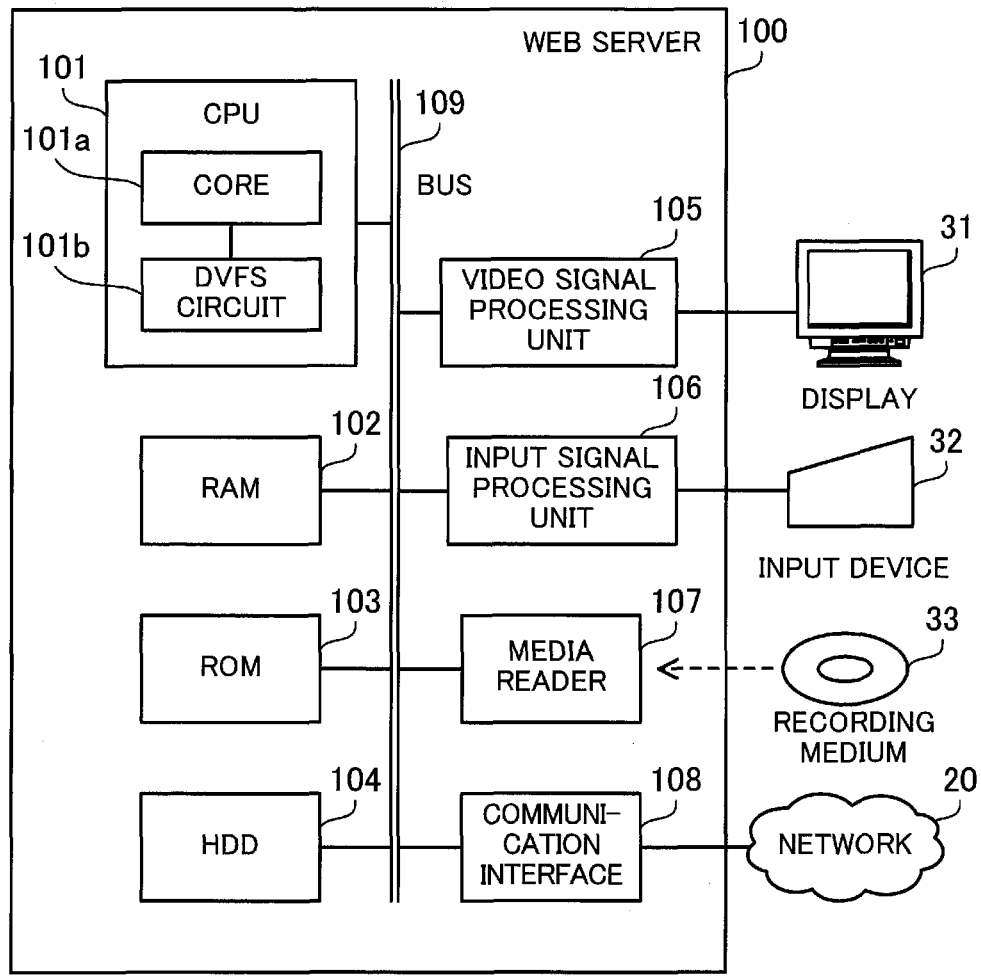
FIG. 3 is a block diagram illustrating an exemplary hardware configuration of a Web server.

FIG. 3 is a block diagram illustrating an exemplary hardware configuration of a Web server.

The Web server 100 includes a CPU 101, RAM 102, ROM 103, HDD 104, video signal processing unit 105, input signal processing unit 106, media reader 107, and communication interface 108. These units are connected to a bus 109 within the Web server 100. The client 21, application server 100a, and database server 100b may have the same hardware configuration as the Web server 100. The CPU 101 is an example of the processor 11 of the first embodiment. The RAM 102, ROM 103 and HDD 104 are examples of the storage unit 12 of the first embodiment.

The CPU 101 is a processor that controls the Web server 100. The CPU 101 includes at least one core (core 101a) and DVFS circuit 101b.

The core 101a includes an arithmetic and logic circuit, register, and others, and executes instructions from programs. The core 101a has a plurality of performance levels called "P-states", which have different combinations of clock frequency and voltage, as will be described later. In this connection, the CPU 101 may include a plurality of cores so as to perform instructions of a program in parallel.

The DVFS circuit 101b performs DVFS for the core 101a, and changes the P-state of the core 101a in accordance with an instruction of a program. That is to say, the DVFS circuit 101b controls the frequency of a clock signal and voltage to be supplied to the core 101a. For example, the DVFS circuit 101b changes a multiplication factor to be applied to a base clock signal, which is received through the bus 109, so as to change the clock frequency for the core 101a. In this connection, in the case where the CPU 101 includes a plurality of cores, the DVFS circuit 101b may apply the same P-state to the plurality of cores, or may change the P-state for each core independently.

The RAM 102 is a volatile semiconductor memory that temporarily stores programs to be executed by the CPU 101 and data, and is a primary storage device. In this connection, the Web server 100 may be provided with another kind of primary storage device than the RAM or a plurality of primary storage devices.

The ROM 103 is a non-volatile semiconductor memory that stores the BIOS program. In this connection, a rewritable semiconductor memory, such as a flash memory, may be used in place of the ROM 103. The BIOS program describes a function of starting an OS. When the Web server 100 is activated, the CPU 101 loads the BIOS program to the RAM 102, so that peripheral devices including the HDD 104 become accessible. Then the CPU 101 loads the OS program from the HDD 104 to the RAM 102 in accordance with the BIOS program. The BIOS program also describes a function of instructing the DVFS circuit 101b to change a P-state and a function of monitoring the utilization of the CPU 101.

The HDD 104 is a non-volatile storage device that stores the OS program, application software program, and data for use by the OS and application software, and is a secondary storage device. The OS program describes a function of collecting information on the utilization of the CPU 101 via the BIOS and a function of determining a P-state according to the utilization of the CPU 101 and controlling the DVFS circuit 101*b* via the BIOS. In this connection, the Web server 100 may be provided with another kind of secondary storage device, such as a flash memory, solid State Drive (SSD), or the like, or a plurality of secondary storage devices.

The video signal processing unit 105 outputs a video to a display 31 connected to the Web server 100 under the control of the CPU 101. As the display 31, for example, a Cathode Ray Tube (CRT) display, Liquid Crystal Display (LCD), Plasma Display Panel (PDP), Organic Electro-Luminescence (OEL) display, or the like may be used.

The input signal processing unit 106 receives and sends an input signal from an input device 32 connected to the Web server 100, to the CPU 101. As the input device 32, a pointing device, such as a mouse, touch panel, touchpad, trackball, etc., a keyboard, a remote controller, a button switch, or the like may be used. Some kinds of input devices may be connected to the Web server 100.

The media reader 107 is a reader device for reading programs and data from a recording medium 33. As the recording medium 33, for example, a magnetic disk, such as Flexible Disk (FD) or HDD, an optical disc, such as Compact Disc (CD) or Digital Versatile Disc (DVD), a magneto-optical disk (MO), a semiconductor memory, or the like may be used. The media reader 107 stores programs and data read from the recording medium 33 in the RAM 102 or the HDD 104, for example.

The communication interface 108 is connected to a network 20 for communications with the client 21, the application server 100*a*, and other computers over the network 20. The communication interface 108 may be connected to a communication device such as a switch belonging to the network 20 with, for example, a cable.

In this connection, the Web server 100 may be configured without the media reader 107. In the case where the Web server 100 is controlled from a terminal device (the client 21 or the like) operated by a user over the network 20, the Web server 100 may be configured without the video signal processing unit 105 or input signal processing unit 106. In addition, the display 31 and input device 32 may be provided as one unit with the Web server 100.

The following describes the definitions of P-states and a problem that may occur in DVFS.

FIG. 4 illustrates an exemplary correspondence between P-states and clock frequencies.

The CPU 101 has nine P-states P0 to P8 defined as performance levels. P0 is a P-state with the highest clock frequency, whereas P8 is a P-state with the lowest clock frequency. That is to say, P0 is the highest performance level at which the CPU 101 operates at its maximum processing capacity, whereas P8 is the lowest performance level at which the CPU 101 operates at its minimum processing capacity. A higher clock frequency leads to higher voltage, whereas a lower clock frequency leads to lower voltage. In short, the CPU 101 consumes most power at P0, whereas the CPU 101 consumes least power at P8.

For example, P0 has a clock frequency of 2261 MHz (2.261 GHz), P1 has a clock frequency of 2128 MHz, P2 has a clock frequency of 1995 MHz, P3 has a clock frequency of 1862 MHz, P4 has a clock frequency of 1729 MHz, P5 has a clock frequency of 1596 MHz, P6 has a clock frequency of 1463 MHz, P7 has a clock frequency of 1330 MHz, and P8 has a clock frequency of 1197 MHz. In addition, voltage increases or decreases with increase or decrease in clock frequency, with positive correlation between them.

To make the P-state control by the OS easy and to simplify the following explanation on the P-state control, it is assumed in the second embodiment that the OS uses only P0, P4, and P8 out of P0 to P8. That is, one of the three P-states, P0, P4, and P8 is requested by the OS to the DVFS circuit 101*b* via the BIOS.

The OS adjusts the P-state according to the utilization of the CPU 101 in order to reduce power consumption of the CPU 101 in consideration of performance. When the CPU utilization goes up (for example, when the CPU utilization reaches or exceeds an upper limit threshold) while the CPU 101 operates at P8, the OS increases the P-state from P8 to P4. If the CPU utilization does not go down sufficiently (for example, if the CPU utilization is still above the upper limit threshold) even after the increase of the P-state to P4, the OS further increases the P-state from P4 to P0. The reason why the P-state is increased stepwise is because, when the CPU utilization is 100%, it is difficult to estimate how much processing capacity is further needed (how much processing capacity needs to be increased to reduce the CPU utilization sufficiently).

On the other hand, when the CPU utilization goes down (for example, when the CPU utilization becomes lower than a lower limit threshold) while the CPU 101 operates at P0, the OS decreases the P-state from P0 to P4 or P8. At this time, the OS is capable of estimating, from the current CPU utilization, the CPU utilization for the case of decreasing the P-state to P8. Therefore, the OS is capable of determining according to the current CPU utilization whether to decrease the P-state from P0 to P4 or to P8. For example, the OS decreases the P-state to P8 if the CPU utilization estimated for the case of decreasing the P-state to P8 is less than the upper limit threshold. Otherwise, the OS decreases the P-state to P4.

The above-described P-state control is performed by each of the Web server 100, application server 100*a*, and database server 100*b* independently.

By the way, power saving of the CPU 101 is not obtained if the P-state is changed excessively and too frequently according to instantaneous changes in CPU utilization. Even if the CPU utilization rapidly goes up in a moment, this may be short-lived and the CPU utilization may goes down rapidly in the next moment. If the processing capacity of the CPU 101 is increased instantaneously according to such a short-lived increase in the CPU utilization, the idle time of the CPU 101 is increased and thus the utilization efficiency of the CPU 101 is reduced. In addition, changing the P-state excessively and too frequently may increase the overhead of the OS due to interruptions to the CPU 101 and thus degrade the performance of application software.

To deal with this, the OS confirms the CPU utilization and determines whether to change the P-state of the CPU 101 at every regular interval (for example, an interval of 500 ms). In this second embodiment, a P-state control time refers to a time of determining whether to change the P-state, and a P-state control interval refers to a time interval between P-state control times. Even if the CPU utilization rapidly goes up in a moment, the P-state remains the same if the CPU utilization goes down by the next P-state control time. For example, even if the Web server 100 temporarily receives a number of requests, the P-state does not need to be increased if the Web server 100 completes the processing of the requests by the next P-state control time. This reduces average power consumption of the CPU 101.

On the other hand, using a fixed P-state control interval causes a following problem.

Figure 5:
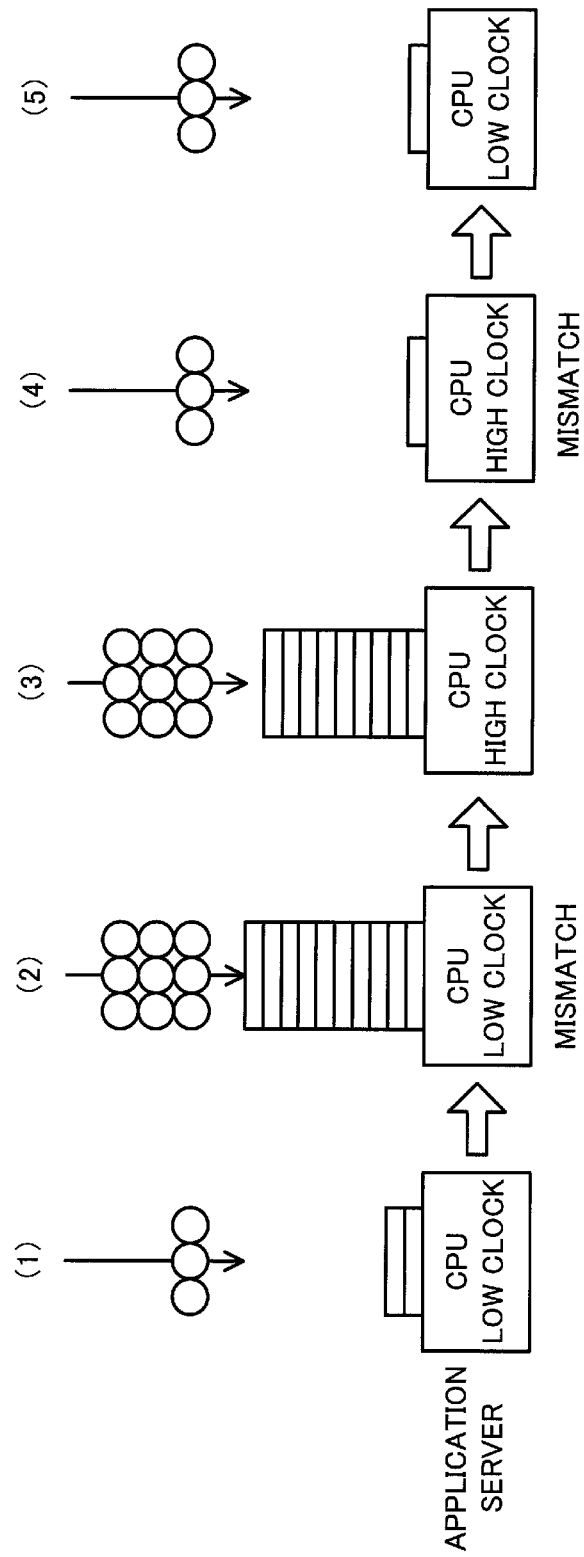
FIG. 5 illustrates examples of a mismatch between input load and clock frequency.

FIG. 5 illustrates examples of a mismatch between input load and clock frequency.

The following describes the case of DVFS that is executed by the application server 100a. In this connection, the same problem may occur in the Web server 100 and database server 100b.

Load (input load) externally given to the application server 100a is proportional mainly to the number of requests received from the Web server 100. The number of requests the application server 100a receives from the Web server 100 per unit time, that is, input load per unit time is not constant but may frequently vary. A wave of variation in the input load may have different periods. It is assumed that the wave of variation in the input load may have periods equal to or approximate to the P-state control interval of the application server 100a, and the amplitude of the wave is sufficiently large. In this case, an "anti-synchronization" phenomenon may occur between the input load and the P-state.

This "anti-synchronization" phenomenon between input load and P-state is that the input load and P-state come into synchronization with each other with negative correlation and thus a mismatch between the input load and the P-state occurs and continues. If the "anti-synchronization" phenomenon occurs, a state with a low P-state under high input load and a state with a high P-state under low input load appear alternately and repeatedly. This results in inefficient operation of the CPU in the application server 100a.

For example, assume a state (1) where the application server 100a is under low input load (receives a few requests) and operates at a low P-state (at a low clock frequency of the CPU). Then, the state moves to a state (2) where the input load rises (the number of requests received increases) because the input load varies periodically. However, the P-state is not changed until the next P-state control time comes. Therefore, the application server 100a keeps operating at the low P-state (at the low clock frequency). That is, a mismatch in which the input load is high but the P-state is low occurs. In this state, the number of pending requests increases and the response times for the Web server 100 rapidly worsen.

The next state is a state (3) where the P-state control time comes, and the P-state is increased (the clock frequency of the CPU is increased) because the CPU utilization is high. Thereby, the number of pending requests decreases and the application server 100a gradually improves the response times for the Web server 100. Then, the state moves to a state (4) where the input load falls (the number of requests received decreases) because the input load varies periodically. However, the P-state is not changed until the next P-state control time comes. Therefore, the application server 100a keeps operating at the high P-state (at the high clock frequency). That is, a mismatch in which the input load is low but the P-state is high occurs. In this state, power saving of the CPU is not obtained.

The next state is a state (5) where the P-state control time comes, and the P-state is decreased (the clock frequency of the CPU is lowered) because the CPU utilization is low. Thereby, power saving of the CPU is achieved. The state is then returned back to the above state (1). Note that the period of the variation in the input load is equal to or approximate to the P-state control interval, and thus the mismatch in the state (2) and the mismatch in the state (4) alternately and repeatedly occur.

Figure 6:
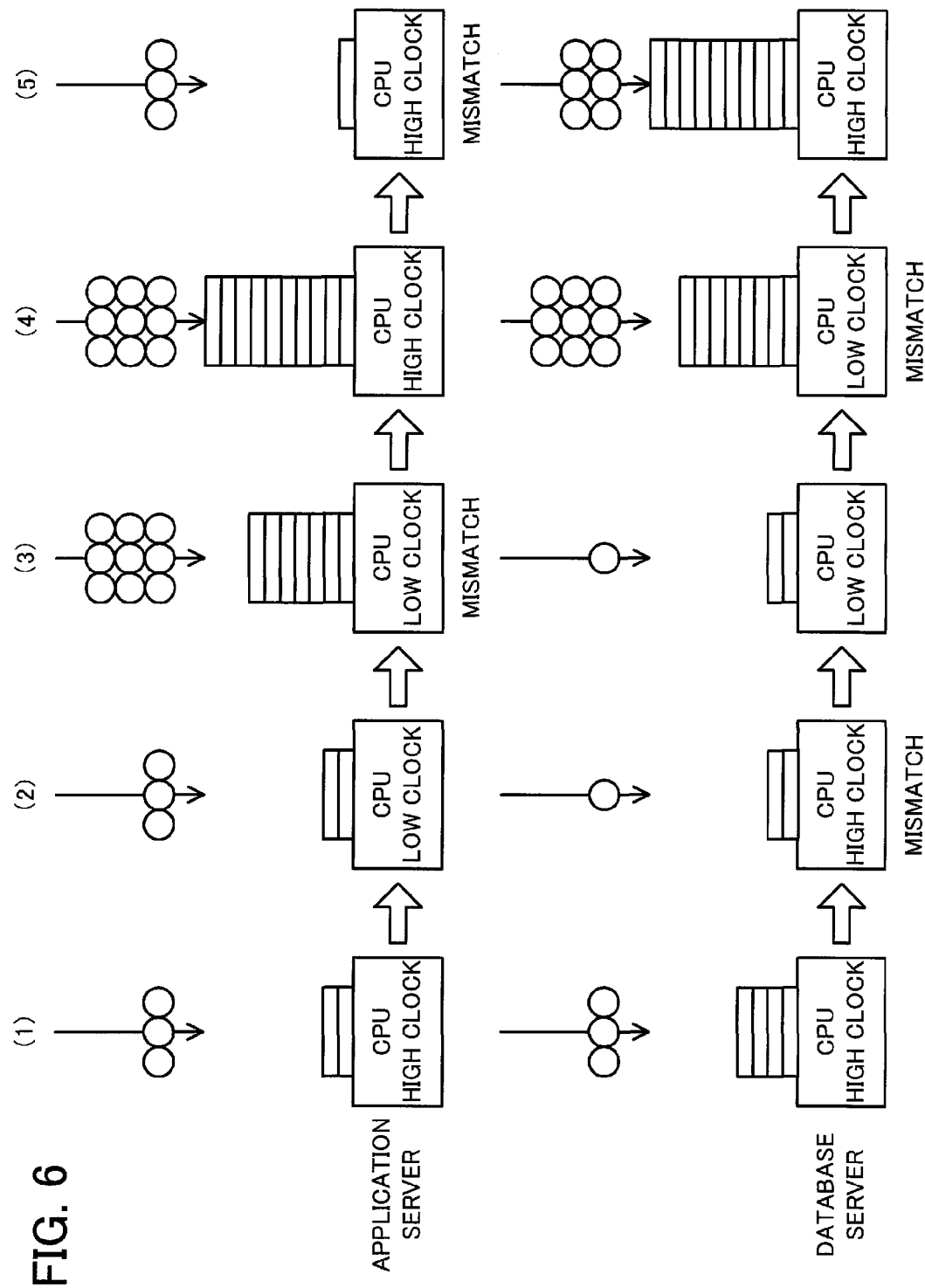
FIG. 6 illustrates an exemplary propagation of a mismatch between input load and clock frequency.

FIG. 6 illustrates an exemplary propagation of a mismatch between input load and clock frequency.

The above explanation is about a mismatch between input load and P-state, focusing on a single server computer. This mismatch may spread in a system where a plurality of server computers cooperates with each other, like a Web-based system with 3-Tier architecture. The following describes the case where the application server 100a and database server 100b cooperate with each other. The same problem may occur between the Web server 100 and application server 100a.

For example, assume a state (1) where both the application server 100a and the database server 100b are under low input load and operate at a high P-state. Then, assume a state (2) where a P-state control time for the application server 100a comes. The P-state of the application server 100a is decreased because the CPU utilization is low. As a result, the request processing speed of the application server 100a slows down. Therefore, the input load on the database server 100b falls accordingly. However, the database server 100b keeps operating at the high P-state until the next P-state control time comes. That is, a mismatch between the input load and the P-state occurs.

The next state is a state (3) where the input load on the application server 100a rises. However, the application server 100a keeps operating at the low P-state until the next P-state control time comes. That is, a mismatch between the input load and the P-state occurs. On the other hand, when the P-state control time for the database server 100b comes, the P-state of the database server 100b is decreased because the CPU utilization is low.

The state moves to a state (4) where the P-state control time for the application server 100a comes. The P-state of the application server 100a is increased because the CPU utilization is high. As a result, the request processing speed of the application server 100a increases. Therefore, the input load on the database server 100b rises accordingly. However, the database server 100b keeps operating at the low P-state until the next P-state control time comes. That is, a mismatch between the input load and the P-state occurs.

The next state is a state (5) where the input load on the application server 100a falls. However, the application server 100a keeps operating at the high P-state until the next P-state control time comes. Therefore, a mismatch between the input load and the P-state occurs. On the other hand, when the P-state control time for the database server 100b comes, the P-state of the database server 100b is increased since the CPU utilization is high. Thereby, the pending requests are processed. The state is then returned back to the above state (1).

As described above, a mismatch between the input load and the P-state in the application server 100a and a mismatch between the input load and the P-state in the database server 100b alternately and repeatedly occur. This means that there is always such a mismatch at any layer in the Web-based system. In addition, a mismatch in a former server computer (application server 100a) amplifies variation in input load on a latter server computer (database server 100b). This causes a problem in that the response times for the client 21 considerably worsen in the Web-based system.

To deal with this, in the Web server 100, application server 100a, and database server 100b of the second embodiment, a variable P-state control interval is set in order to suppress the "anti-synchronization" phenomenon between input load and P-state. Suppressing the "anti-synchronization" phenomenon enables the CPU of each server computer to operate efficiently and to improve response times for the client 21. The following describes the case where the Web server 100 performs the P-state control. The application server 100a and database server 100b perform the P-state control in the same way as the Web server 100.

Figure 7:
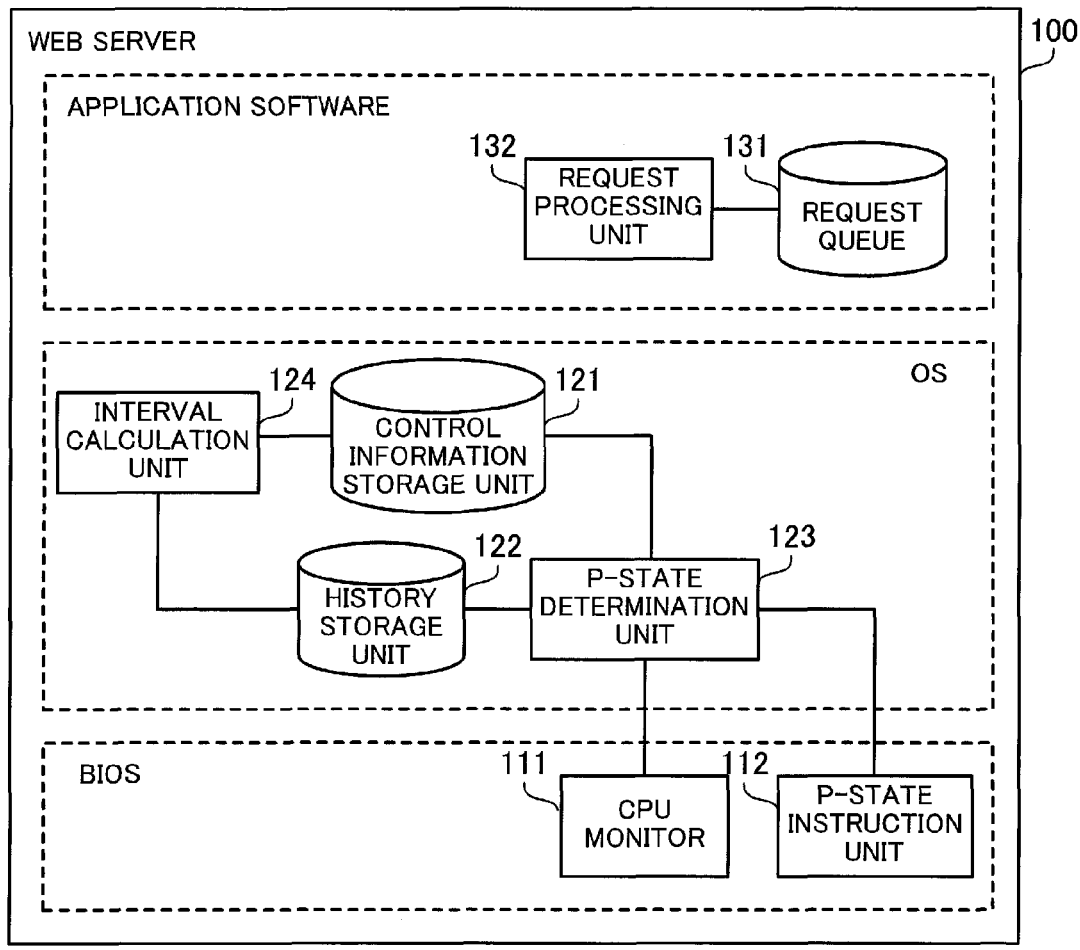
FIG. 7 is a block diagram illustrating exemplary functions of a Web server.

FIG. 7 is a block diagram illustrating exemplary functions of a Web server.

The Web server 100 includes a CPU monitor 111, P-state instruction unit 112, control information storage unit 121, history storage unit 122, P-state determination unit 123, interval calculation unit 124, request queue 131, and request processing unit 132.

For example, the CPU monitor 111 and P-state instruction unit 112 are implemented as BIOS program modules. The control information storage unit 121 and history storage unit 122 are implemented as storage areas saved in the RAM 102 or HDD 104 that is used by the OS. The P-state determination unit 123 and interval calculation unit 124 are implemented as OS program modules. The request queue 131 is implemented as a storage area saved in the RAM 102 or HDD 104 that is used by application software. The request processing unit 132 is implemented as a program module of application software.

The CPU monitor 111 monitors the utilization of the CPU 101 and reports the monitoring result to the P-state determination unit 123. For example, the CPU monitor 111 obtains samples indicating whether the core 101a is executing an instruction or not, at some time points, and reports the sampling results to the P-state determination unit 123. A percentage of samples indicating that an instruction is being executed is taken as CPU utilization.

The P-state instruction unit 112 controls changing of a P-state in accordance with a request from the P-state determination unit 123. For example, P-state instruction unit 112 instructs the DVFS circuit 101b to change the P-state of the core 101a to a P-state determined by the P-state determination unit 123. Thereby, the DVFS circuit 101b changes the frequency of a clock signal and voltage to be supplied to the core 101a. A correspondence among P-states, clock frequencies, and voltages is defined in the DVFS circuit 101b in advance.

The control information storage unit 121 stores control information that is used for the P-state control. The control information includes information indicating a P-state control interval, i.e., an interval for determining whether to change the P-state of the CPU 101. The control information is generated by the interval calculation unit 124 and is referenced by the P-state determination unit 123. The history storage unit 122 stores history information indicating change logs of the P-state. The history information includes a time indicating when the P-state was changed and a P-state after the change. The history information is generated by the P-state determination unit 123 and is referenced by the interval calculation unit 124.

The P-state determination unit 123 intermittently adjusts the P-state at every P-state control interval indicated by the control information stored in the control information storage unit 121. When a P-state control time comes, the P-state determination unit 123 calculates the current CPU utilization based on a report received from the CPU monitor 111, and determines based on the current CPU utilization and current P-state whether to change the P-state. As described earlier, for example, when the P-state is P8 and the CPU utilization is higher than or equal to an upper limit threshold, the P-state determination unit 123 determines to change the P-state from P8 to P4. When the P-state is P4 and the CPU utilization is higher than or equal to the upper limit threshold, the P-state determination unit 123 determines to change the P-state from P4 to P0. When the P-state is P0 and the CPU utilization is lower than a lower limit threshold, the P-state determination unit 123 determines to change the P-state from P0 to P4 or P8.

When determining to change the P-state, the P-state determination unit 123 notifies the P-state instruction unit 112 of a new P-state. The P-state determination unit 123 also adds information indicating the present time and the new P-state to the history information stored in the history storage unit 122. At this time, the P-state determination unit 123 may leave a predetermined number of latest records or records that were generated within a predetermined time period from the present time, and delete the other old records.

The interval calculation unit 124 calculates an appropriate P-state control interval on the basis of a period of variation in input load on the Web server 100. When the calculated P-state control interval is different from the current P-state control interval, the interval calculation unit 124 updates the control information in the control information storage unit 121. In the second embodiment, the period of variation in input load on the Web server 100 is estimated based on the history information stored in the history storage unit 122. More specifically, the interval calculation unit 124 estimates an average time period between the times at which the P-state of the CPU 101 was increased to P0 as the period of variation in input load. The interval calculation unit 124 calculates a shorter period than the estimated period of variation in input load as the appropriate P-state control interval. In this connection, if the variation in input load is determined to have no periodicity, the P-state control interval is not changed.

A trigger event that causes the interval calculation unit 124 to calculate a P-state control interval may be update of history information (i.e., an event where the P-state determination unit 123 has determined to change the P-state), for example. In addition, a trigger event that initiates calculation of a P-state control interval may be addition of information indicating P0 to the history information (i.e., an event where the P-state of the CPU 101 was increased from P8 or P4 to P0). Alternatively, the interval calculation unit 124 may calculate a P-state control interval at every regular interval that is longer than the current P-state control interval.

The request queue 131 is a queue-like buffer for temporarily storing requests received by the Web server 100. The requests in the request queue 131 are taken out and processed by the request processing unit 132. Requests that are pending due to the lack of processing capacity of the CPU 101 remain in the queue 131. The number of remaining requests may be called a queue length.

The request processing unit 132 sequentially processes the requests stored in the request queue 131, with the CPU 101. For example, the request processing unit 132 identifies business logic to be executed, on the basis of an HTTP request received from the client 21, and sends a request indicating the identified business logic to the application server 100a. When receiving a result of executing the business logic from the application server 100a, the request processing unit 132 generates and sends an HTTP response to the client 21.

Referring to FIG. 7, the OS determines whether to change the P-state, and calculates a P-state control interval. This may be called "OS control". On the other hand, the BIOS may be designed to determine whether to change the P-state and to calculate the P-state control interval. This may be called "BIOS control". In the case of the BIOS control, the control information storage unit 121 and history storage unit 122 are implemented as storage areas saved in the RAM 102 or HDD 104 that is used by the BIOS. In addition, the P-state determination unit 123 and interval calculation unit 124 are implemented as BIOS program modules.

Further, the CPU 101 may include a plurality of cores, and the DVFS circuit 101b may change the P-state for each core independently. In this case, the P-state determination unit 123 may determine for each core whether to change the P-state, and the interval calculation unit 124 may calculate a P-state control interval for each core.

In addition, the above explanation estimates an average time period between the times at which the P-state was increased from P8 or P4 to P0 as a period of variation in input load. Alternatively, an average time period between the times at which the P-state was increased to a predetermined threshold level or higher may be estimated as the period of variation in input load. For example, assume that the OS is capable of adjusting the P-state to one of nine P-states P0 to P9, instead of three P-states P0, P4, and P8. In this case, assuming that P2 is set as a threshold level, an average time period between the times at which the P-state was increased from one of P3 to P8 to one of P0 to P2 may be estimated as a period of variation in input load. Alternatively, the interval calculation unit 124 may calculate an average time period between peak P-states by performing wave analysis on the changes to the P-state indicated by the history information, and estimate the average time period between the peaks as the period of variation in input load. In addition, the interval calculation unit 124 may continuously collect information indicating the queue length of the request queue 131 from the application software, and calculate a period of variation in the queue length as the period of variation in input load.

FIG. 8 illustrates an example of a history table.

A history table 125 is stored in the history storage unit 122. The history table 125 includes the following fields: Time and P-state. The Time field indicates a time when the P-state determination unit 123 determined to change a P-state. This time is represented with an accuracy of milliseconds. The P-state field contains information indicating a P-state after the change (for example, any one of P0, P4, and P8). Out of the records (combinations of time and P-state) included in the history table 125, records with P-state of P0 are used by the interval calculation unit 124 to calculate a P-state control interval.

The following describes how to calculate a P-state control interval.

Figure 9A:
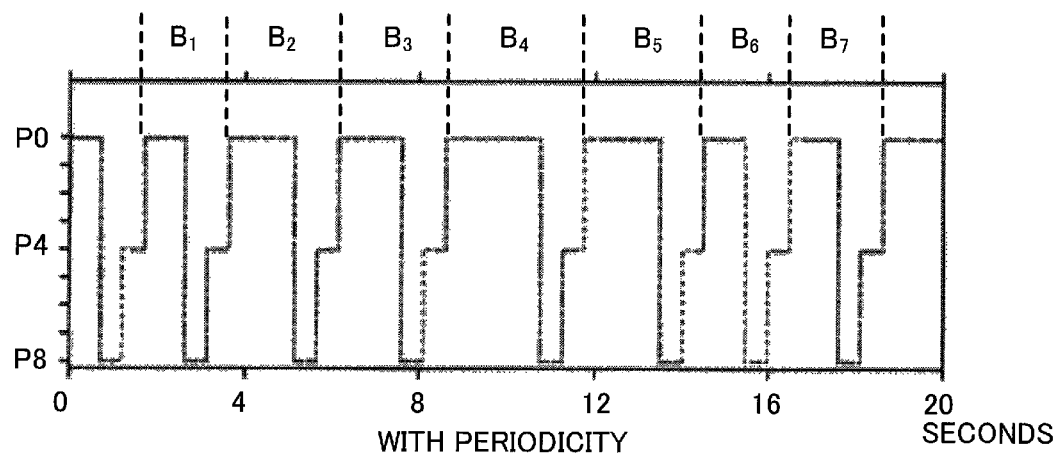
FIGS. 9A and 9B illustrate an example of the periodicity of input load.
Figure 9B:
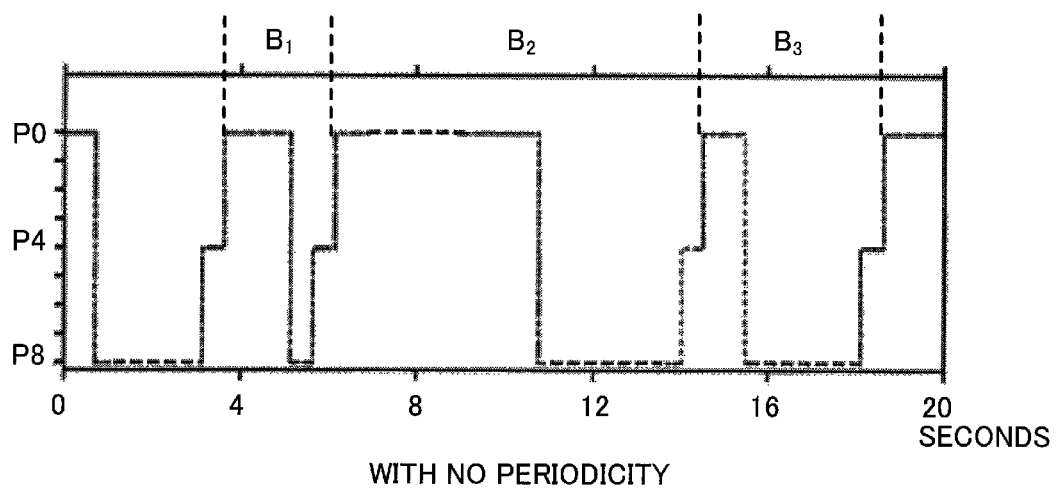

FIGS. 9A and 9B illustrate an example of the periodicity of input load.

The interval calculation unit 124 checks the periodicity of input load, and if determining that the input load varies with periodicity, calculates a P-state control interval that is shorter than a period of variation in input load. As described earlier, the periodicity of the input load is estimated from the periodicity of past P-state.

To check the periodicity of the P-state, the interval calculation unit 124 extracts records with P-state of P0 (records indicating that the P-state was increased from P8 or P4 to P0) from the history table 125. The interval calculation unit 124 calculates, as a time period $B_j$, a time difference between two adjacent records of the extracted records, that is, a time period from when the P-state was increased to P0 to when the P-state was increased to P0 next time. It is now assumed that a number j is given to the time period B between the times at which the P-state was increased to P0 in chronological order, and a number i is given to the most recent time period B (i and j are positive integers satisfying $1 \le j \le i$).

Then, the interval calculation unit 124 calculates an arithmetic average $AA_i$ of k recent time periods $B_j$ (k is an integer of 2 or greater) with the equation (1). For example, the interval calculation unit 124 calculates the arithmetic average $AA_i$ by dividing the summation of time periods $B_i$, $B_{i-1}, B_{i-2}, \ldots, B_{i-k+1}$ by k. Then, the interval calculation unit 124 calculates a standard deviation $SD_i$ of the k recent time periods $B_j$ with the equation (2). For example, the interval calculation unit 124 calculates a summation of (each time period $B_j$ minus arithmetic average $AA_i$) squared, divides the summation by k–1, and then calculates the square root of the result of the division, thereby calculating the standard deviation $SD_i$. Then, the interval calculation unit 124 calculates a variation coefficient $CV_i$ of the k recent time periods B with the equation (3). For example, the interval calculation unit 124 calculates the variation coefficient $CV_i$ by dividing the standard deviation $SD_i$ by the arithmetic average $AA_i$.

$$AA_i = \frac{1}{k} \sum_{j=i-k+1}^{i} B_j \qquad (1)$$

$$SD_i = \sqrt{\frac{1}{k-1} \sum_{j=i-k+1}^{i} (B_j - AA_i)^2} \qquad (2)$$

$$CV_i = \frac{SD_i}{AA_i} \qquad (3)$$

If the calculated variation coefficient $CV_i$ is less than a threshold TH (for example, TH=0.2), the interval calculation unit 124 determines that the past variation in P-state has periodicity, i.e., the input load has periodicity. Referring to FIG. 9A, the time periods $B_1$ to $B_7$ have small variation and the variation coefficient $CV_7$ is small. Therefore, the input load is determined to have periodicity. On the other hand, if the variation coefficient $CV_i$ is greater than or equal to the threshold TH, the interval calculation unit 124 determines that the past variation in P-state has no periodicity, i.e., the input load has no periodicity. Referring to FIG. 9B, the time periods $B_1$ to $B_3$ have large variation and the variation coefficient $CV_3$ is large. Therefore, the input load is determined to have no periodicity.

If the input load is determined to have periodicity, the interval calculation unit 124 calculates a period by shortening the period of variation in input load by a predetermined ratio, as a P-state control interval. More specifically, the interval calculation unit 124 takes one n-th (for example, n=10) of the arithmetic average $AA_i$ of the time periods $B_j$ as the P-state control interval. At this time, the interval calculation unit 124 clips the P-state control interval so that the P-state control interval is greater than or equal to a lower limit value $T_{lower}$ (for example, 50 ms) and less than or equal to an upper limit value $T_{upper}$ (for example, 500 ms). As a result, the P-state control interval $T_i$ is defined as equation (4). The interval calculation unit 124 sets $T_i = T_{lower}$ if $AA_i/n$ is less than the lower limit value $T_{lower}$, sets $T_i = AA_i/n$ if $AA_i/n$ is greater than or equal to the lower limit value $T_{lower}$ and less than or equal to the upper limit value $T_{upper}$, and sets $T_i = T_{upper}$ if $AA_i/n$ exceeds the upper limit value $T_{upper}$.

$$T_i = T_{lower}(\text{if } AA_i/n < T_{lower}) \ T_i = AA_i/n(\text{if } T_{lower} \le AA_i/n \le T_{upper}) \ T_i = T_{upper}(\text{if } AA_i/n > T_{upper}) \qquad (4)$$

Figure 10:
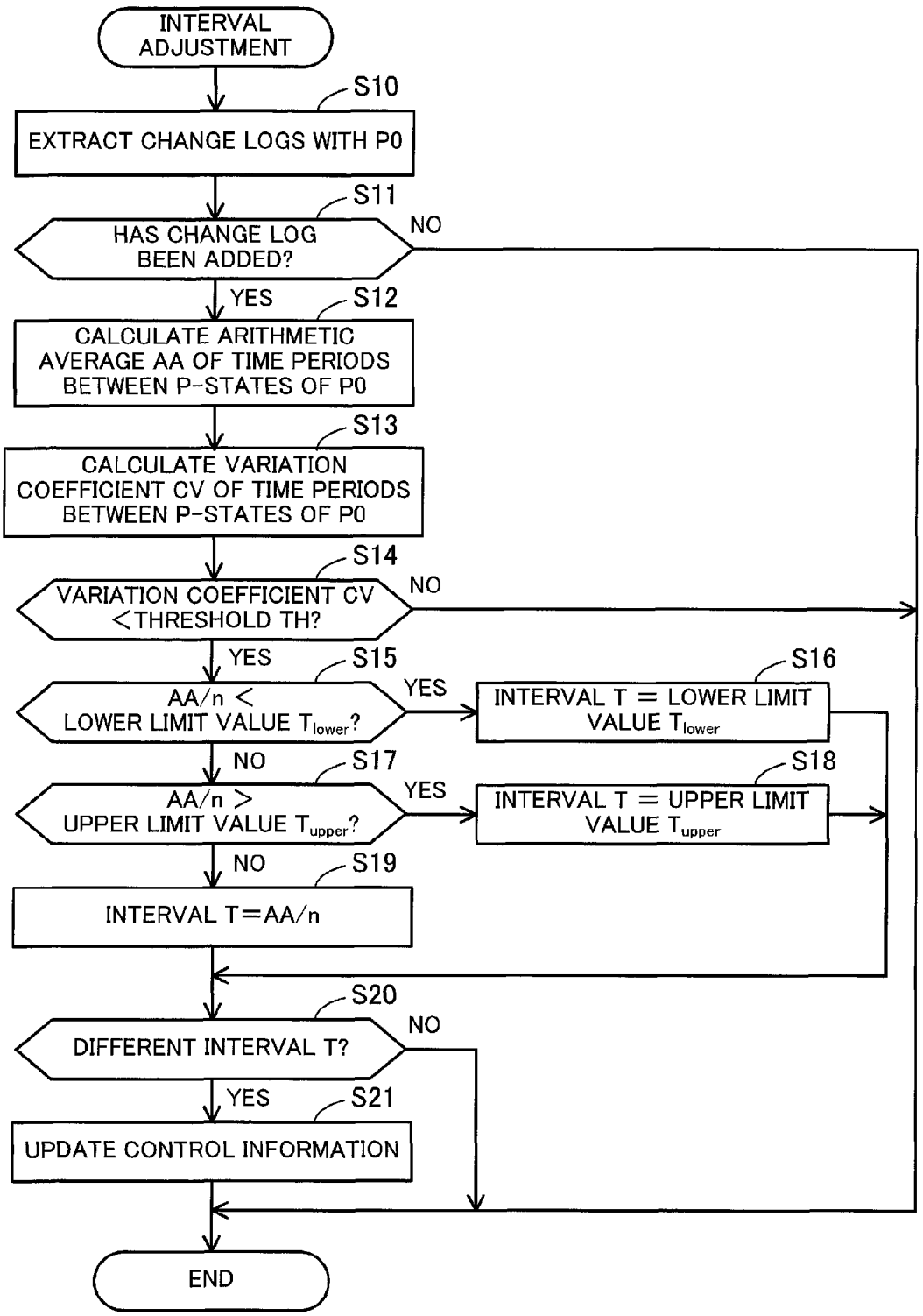
FIG. 10 is a flowchart illustrating an example of an interval adjustment procedure.

FIG. 10 is a flowchart illustrating an example of an interval adjustment procedure.

As described earlier, this interval adjustment may be performed each time the P-state of the CPU 101 is changed or each time the P-state is increased from P4 or P8 to P0.

Alternatively, the interval adjustment may be performed at every predetermined interval longer than a P-state control interval.

(Step S10) The interval calculation unit 124 extracts records (change logs) with P-state of P0 from the history table 125 stored in the history storage unit 122.

(Step S11) The interval calculation unit 124 determines whether the change logs extracted at step S10 include any change log that was added after the last time the interval adjustment of FIG. 10 was performed, i.e., determines whether the P-state was increased to P0 after the last time the interval adjustment was performed. If there is such a change log, the process proceeds to step S12. If not, the interval adjustment is completed.

(Step S12) The interval calculation unit 124 calculates a time period $B_j$ between the times at which the P-state was increased to P0, on the basis of the times indicated by the extracted change logs. At least k recent time periods $B_j$ are calculated. Then, the interval calculation unit 124 calculates the arithmetic average $AA_i$ of the k recent time periods $B_j$.

(Step S13) The interval calculation unit 124 calculates a standard deviation $SD_i$ of the time periods $B_j$ on the basis of the k recent time periods $B_j$ and the arithmetic average $AA_i$ thereof. Then the interval calculation unit 124 calculates a variation coefficient $CV_i$ of the k recent time periods $B_j$ on the basis of the arithmetic average $AA_i$ and standard deviation $SD_i$.

(Step S14) The interval calculation unit 124 determines whether the variation coefficient $CV_i$ calculated at step S13 is less than a threshold TH (for example, 0.2) or not, i.e., whether the variation in the k recent time periods $B_j$ is small or not. If the variation coefficient $CV_i$ is less than the threshold TH, the interval calculation unit 124 determines that the variation in input load has periodicity, and then the process proceeds to step S15. If the variation coefficient $CV_i$ is greater than or equal to the threshold TH, the interval calculation unit 124 determines that the variation in input load has no periodicity, and then the interval adjustment is completed. When there is no periodicity, the current P-state control interval $T_{i-1}$ remains.

(Step S15) The interval calculation unit 124 calculates one n-th ($=AA_i/n$) of the arithmetic average $AA_i$ calculated at step S12. n is a parameter that has an influence on the speed of the interval adjustment and is, for example, n=10. The interval calculation unit 124 determines whether $AA_i/n$ is less than a lower limit value $T_{lower}$ or not. If $AA_i/n$ is less than the lower limit value $T_{lower}$, the process proceeds to step S16. If not, the process proceeds to step S17.

(Step S16) The interval calculation unit 124 sets the P-state control interval $T_i$ to the lower limit value $T_{lower}$ (for example, 50 ms). Then the process proceeds to step S20.

(Step S17) The interval calculation unit 124 determines whether $AA_i/n$ exceeds an upper limit value $T_{upper}$ or not. If $AA_i/n$ exceeds the upper limit value $T_{upper}$, the process proceeds to step S18. If not, the process proceeds to step S19.

(Step S18) The interval calculation unit 124 sets the P-state control interval $T_i$ to the upper limit value $T_{upper}$ (for example, 500 ms). Then the process proceeds to step S20.

(Step S19) The interval calculation unit 124 sets the P-state control interval $T_i$ to $AA_i/n$. In this way, the P-state control interval $T_i$ that falls within a predetermined range is calculated.

(Step S20) The interval calculation unit 124 determines whether the P-state control interval $T_i$ calculated at step S16, S18, or S19 is different from the current P-state control interval $T_{i-1}$. The current P-state control interval is confirmed with reference to the control information stored in the control information storage unit 121. If $T_i$ is different from $T_{i-1}$, the process proceeds to step S21. If $T_i$ is the same as $T_{i-1}$, the interval adjustment is completed without updating the control information.

(Step S21) The interval calculation unit 124 updates the control information stored in the control information storage unit 121 to indicate thus calculated P-state control interval $T_i$.

The following describes operational differences between the case of using a variable P-state control interval and the case of a fixed P-state control interval.

Figure 11A:
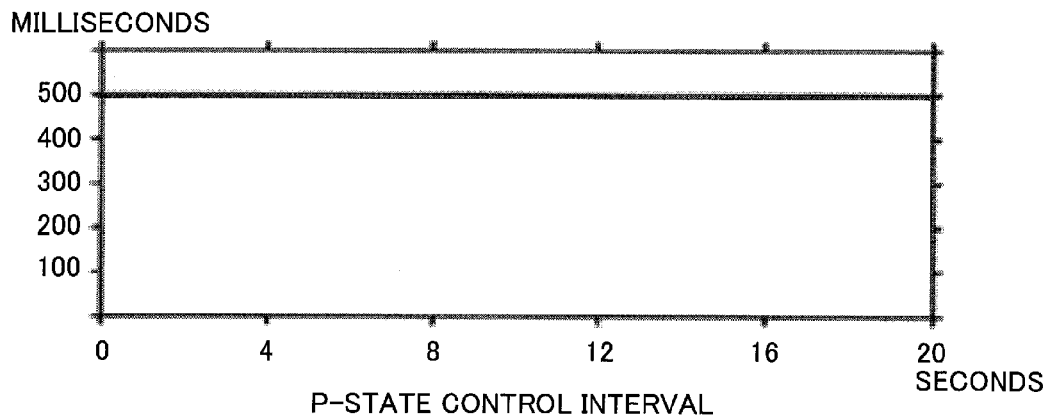
FIGS. 11A to 11C and 12A to 12C are graphs illustrating first and second examples of simulating the operation of a CPU.
Figure 11B:
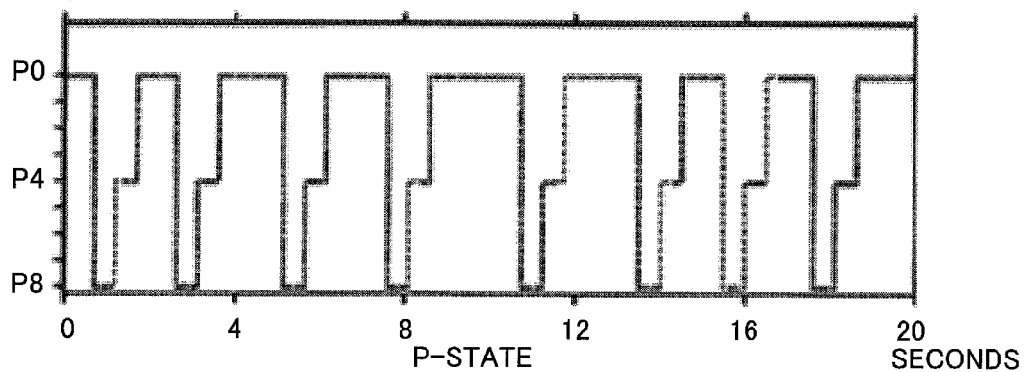
Figure 11C:
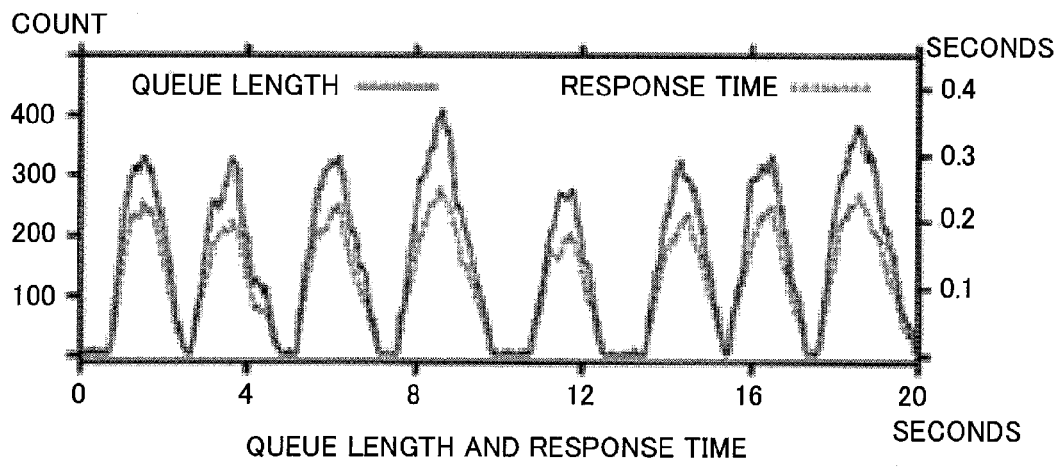

FIGS. 11A to 11C are graphs illustrating a first example of simulating the operation of a CPU.

This simulation example considers the case of using a fixed P-state control interval of 500 ms. Assume now that a period of variation in input load is equal to or approximate to 500 ms. In this case, an "anti-synchronization" phenomenon occurs between input load and P-state.

Referring to FIGS. 11A to 11C, the queue length (the number of pending requests remaining in the request queue 131) rapidly increases after the P-state is decreased from P0 to P8 and before the P-state is increased from P8 to P4. On the other hand, the queue length rapidly decreases after the P-state is increased from P4 to P0. Then the state where the queue length is short continues for a while. That is to say, such a rapid increase and decrease in the queue length are repeated due to the "anti-synchronization" phenomenon. When the queue length rapidly increases, the request response times rapidly become longer accordingly. That is to say, a variation in request response time becomes large and the performance is degraded.

Figure 12A:
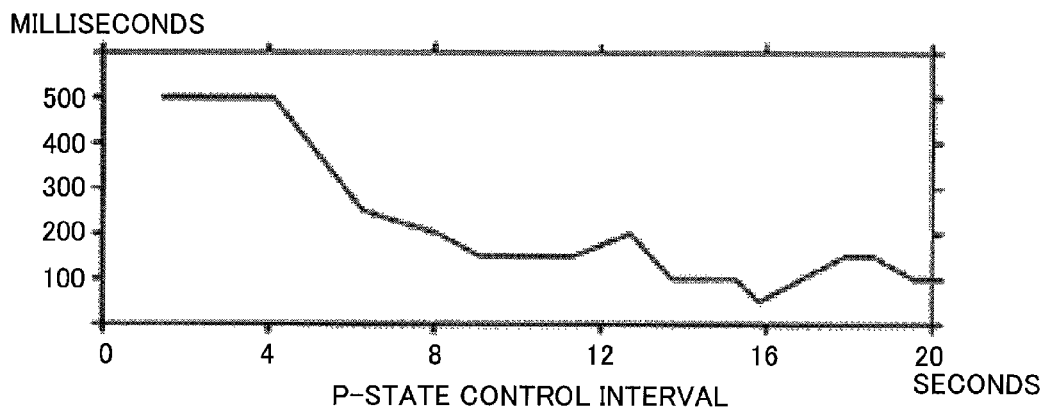
Figure 12B:
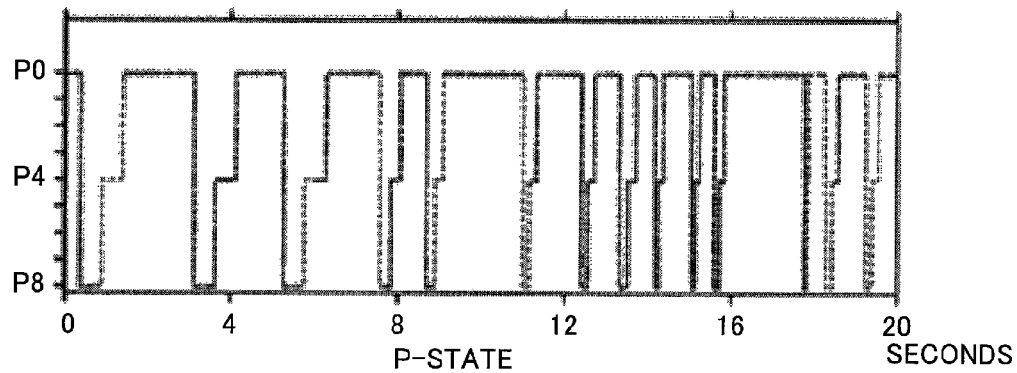
Figure 12C:
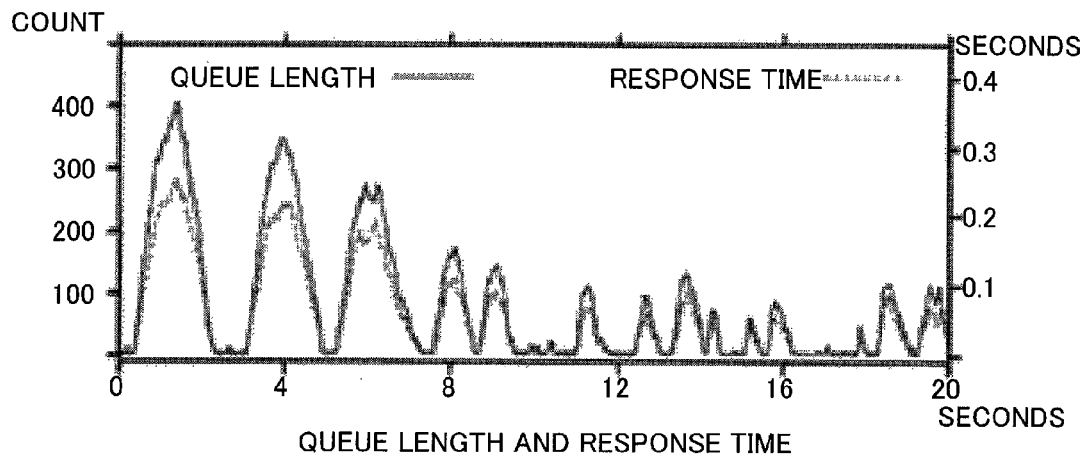

FIGS. 12A to 12C are graphs illustrating a second example of simulating the operation of a CPU.

This simulation example considers the case of using a variable P-state control interval with the method described in FIG. 10. When the periodicity of input load is detected, the P-state control interval is gradually shortened, starting with 500 ms. When the P-state control interval is shortened, a time lag from a change of the input load to a change of the P-state becomes shorter, so that the input load is appropriately reflected on the P-state. That is, an "anti-synchronization" phenomenon between the input load and the P-state is reduced. Then, the P-state control interval, which is calculated based on an average time period between the times at which the P-state was increased to P0, is converged. Referring to the example of FIG. 12A, the P-state control interval is converged to about 100 ms. The P-state control interval is changed according to a change in the period of variation in input load.

In addition, a mismatch between input load and P-state is reduced, and thereby the longest queue length is shorter than the case illustrated in FIGS. 11A to 11C. Suppressing an increase in the queue length leads to suppressing an increase in request response times. That is, a variation in request response time becomes small, and thus application software exhibits stable performance.

By the way, in the case where the input load is determined to have no periodicity, the method described in FIG. 10 keeps using the current P-state control interval. Therefore, if the periodicity of the input load disappears after the P-state control interval is shortened, the shortened P-state control interval is maintained for a while. On the other hand, in the case where the input load has no periodicity, a possibility of the "anti-synchronization" phenomenon is low, so that a long P-state control interval may be set. In addition, when the period of variation in input load becomes long, it may appear that the periodicity of the input load has disappeared transiently. In this case, the P-state control interval may be set longer without waiting for the period of variation in input load to become stable.

There is a modification example in which a P-state control interval is changed even when the input load is determined to have no periodicity. However, for the above reasons, the P-state control interval is allowed to be set longer but shortening of the P-state control interval is prevented.

More specifically, in the case where input load is determined to have no periodicity, the P-state control interval $T_i$ is defined as equation (5). The interval calculation unit 124 sets $T_i=T_{i-1}$ when $AA_i/n$ is less than or equal to the current P-state control interval $T_{i-1}$. That is, the current P-state control interval is not made shorter but is maintained. In addition, the interval calculation unit 124 sets $T_i=AA_i/n$ when $AA_i/n$ is greater than $T_{i-1}$ and less than or equal to the upper limit value $T_{upper}$, and sets $T_i=T_{upper}$ when $AA_i/n$ exceeds the upper limit value $T_{upper}$.

$$T_i=T_{i-1}(\text{if } AA_i/n \le T_{i-1}) \quad T_i=AA_i/n(\text{if } T_{i-1}<AA_i/n \le T_{upper})$$
$$T_i=T_{upper}(\text{if } AA_i/n > T_{upper}) \qquad (5)$$

Figure 13:
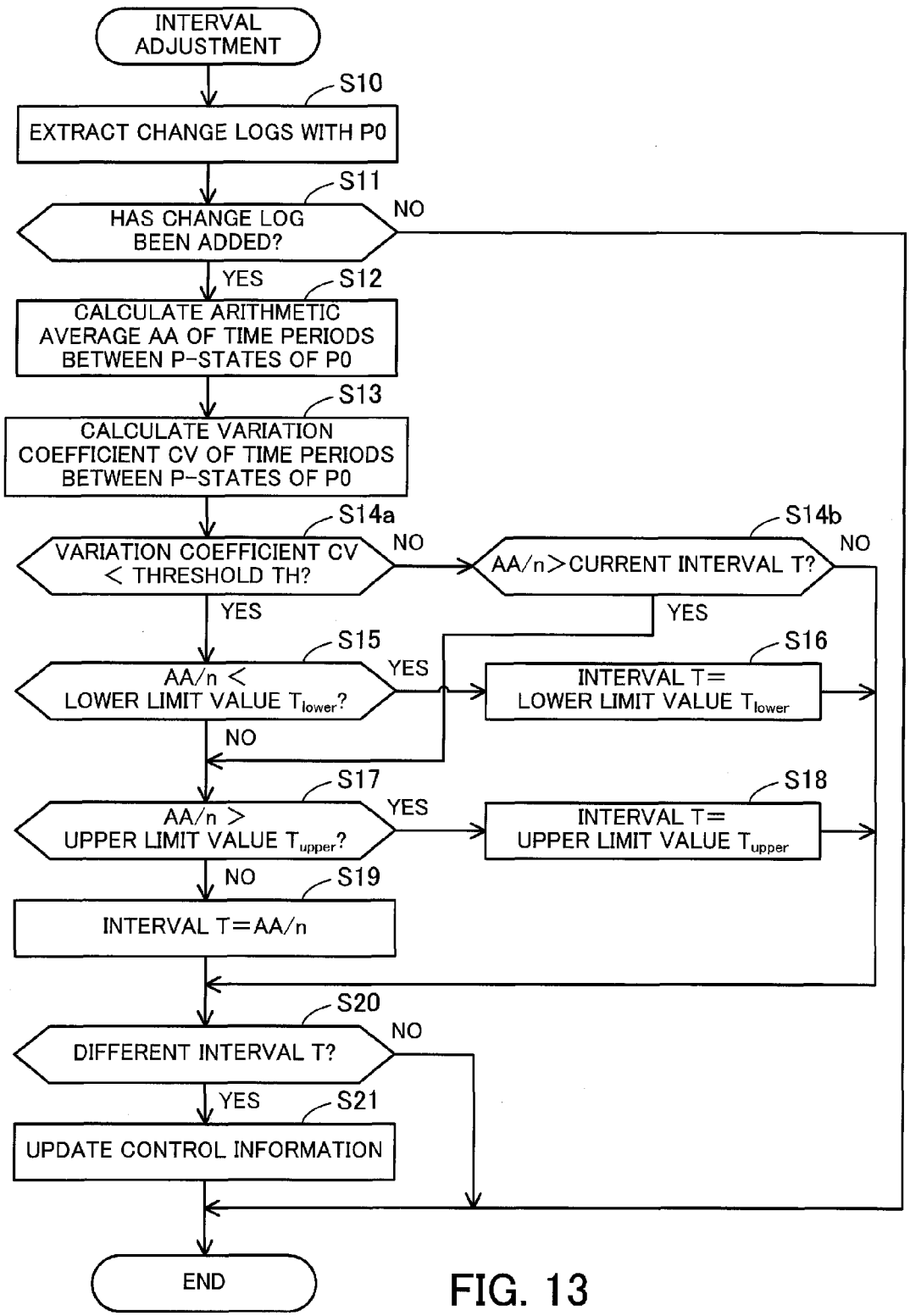
FIG. 13 is a flowchart illustrating another example of the interval adjustment procedure.

FIG. 13 is a flowchart illustrating another example of the interval adjustment procedure.

In this modification example of the interval adjustment, the following steps S14a and S14b are executed in place of step S14 of FIG. 10. The other steps of FIG. 13 are the same as those of FIG. 10.

(Step S14a) The interval calculation unit 124 determines whether the variation coefficient $CV_i$ calculated at step S13 is less than the threshold TH or not, i.e., whether the variation in the k recent time periods $B_j$ is small or not. If the variation coefficient $CV_i$ is less than the threshold TH, the interval calculation unit 124 determines that the variation in input load has periodicity, and then the process proceeds to step S15. If the variation coefficient $CV_i$ is greater than or equal to the threshold TH, the interval calculation unit 124 determines that the variation in input load has no periodicity, and then the process proceeds to step S14b.

(Step S14b) The interval calculation unit 124 calculates one n-th ($AA_i/n$) of the arithmetic average $AA_i$ calculated at step S12. The interval calculation unit 124 then determines whether $AA_i/n$ is greater than the current P-State control interval or not. If $AA_i/n$ is greater than $T_{i-1}$, the process proceeds to step S17. If not, the process proceeds to step S20.

According to the information processing system of the second embodiment, a P-state control interval of each of the Web serve 100, application server 100a, and the database server 100b is calculated according to a period of variation in input load. Especially, the P-state control interval is set to be 1/n of the period of variation in input load. Therefore, a mismatch between input load and P-state is reduced, so as to operate a CPU efficiently and to improve the performance of application software. In addition, as compared with the case of using a fixed short P-state control interval, an overhead for the P-state control is reduced and power saving of the CPU is achieved.

In addition, estimating a period of variation in input load from change logs of the P-state eliminates the need of collecting information from application software, so that an OS or BIOS performs the P-state control in a centralized manner. Therefore, it becomes easy to implement the P-state control. In this connection, the period of variation in input load may be estimated from change logs of the P-state with a sufficient accuracy for reducing a mismatch between the input load and the P-state. For example, variation in input load that does not cause a change to the P-state may be ignored because it has little influence on the "anti-synchronization" phenomenon.

In this connection, as described earlier, the information processing of the first embodiment is realized by causing the information processing apparatus 10 to execute a program. In addition, the information processing of the second embodiment is realized by causing the client 21, Webs server 100, application server 100a, and database server 100b to execute programs.

Such a program may be recorded on a computer-readable recording medium (for example, recording medium 33). Recording media include, for example, magnetic disks, optical discs, magneto-optical disks, semiconductor memories, etc. The magnetic disks include FD and HDD. The optical discs include CD, CD-R (Recordable), CD-RW (Rewritable), DVD, DVD-R, DVD-RW, etc. The program may be recorded on a portable recording medium and distributed. In this case, the program may be executed after being installed from the portable recording medium to another recording medium (for example, HDD 104).

According to one aspect, it is possible to reduce a mismatch between load and the performance level of a processor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An information processing apparatus comprising:
   at least one processor configured to be capable of switching a performance level to one of a plurality of performance levels with different power consumption; and
   a storage unit configured to store a program for controlling the performance level of the at least one processor,
   wherein
   the at least one processor executing the program performs a procedure including:
      detecting times when the performance level of the processor was increased from a first level to a second level, the first level being lower than a threshold, the second level being equal to or greater than the threshold;
      calculating an average time period between the detected times; and
      changing, according to the calculated average time period, a determination interval for determining whether to switch the performance level of the processor.
2. The information processing apparatus according to claim 1, wherein the determination interval is shorter than the average time period.
3. The information processing apparatus according to claim 1, wherein the procedure further includes preventing shortening of the determination interval upon determining that the detected times have no periodicity.

4. The information processing apparatus according to claim 1, wherein the plurality of performance levels differ in at least one of a clock frequency and voltage to be supplied to the processor.

5. A load control method executed by a computer including a processor capable of switching a performance level to one of a plurality of performance levels with different power consumption, the load control method comprising:
   detecting times when the performance level of the processor was increased from a first level to a second level, the first level being lower than a threshold, the second level being equal to or greater than the threshold;
   calculating an average time period between the detected times; and
   changing, according to the calculated average time period, a determination interval for determining whether to switch the performance level of the processor.

6. A non-transitory computer-readable recording medium storing a load control program causing a computer including a processor capable of switching a performance level to one of a plurality of performance levels with different power consumption to perform a process comprising:
   detecting times when the performance level of the processor was increased from a first level to a second level, the first level being lower than a threshold, the second level being equal to or greater than the threshold;
   calculating an average time period between the detected times; and
   changing, according to the calculated average time period, a determination interval for determining whether to switch the performance level of the processor.

* * * * *